United States Patent [19]

Sakamoto et al.

[11] Patent Number: 6,013,643
[45] Date of Patent: Jan. 11, 2000

[54] MILDEW RESISTANT ORGANOPOLYSILOXANE COMPOSITIONS

[75] Inventors: Takafumi Sakamoto, Annaka; Tokuo Sato, Matsuida-machi, both of Japan

[73] Assignee: Shin-Etsu Chemical Co., Ltd., Tokyo, Japan

[21] Appl. No.: 09/086,577

[22] Filed: May 29, 1998

[30] Foreign Application Priority Data

May 30, 1997 [JP] Japan .................................. 9-157873

[51] Int. Cl.$^7$ .......................... A01N 55/02; A01N 43/64
[52] U.S. Cl. ......................... 514/188; 514/359; 514/383
[58] Field of Search ................... 514/241, 188, 514/359, 383

[56] References Cited

U.S. PATENT DOCUMENTS 4,845,111 7/1989 Brandes et al. ........................ 514/383

FOREIGN PATENT DOCUMENTS 0 585 587  3/1994  European Pat. Off. .
06227912  8/1994  Japan .
8-217977  8/1996  Japan .
9-25410  1/1997  Japan .

OTHER PUBLICATIONS

"Chemical Abstracts," vol. 115, No. 1, (Jul., 1991), abstract No. 3163,XP002100918 (JP 2–306907).
"Chemical Abstracts," vol. 126, No. 16, (Apr., 1997), abstract No. 212841,XP002100460 (JP 9–25410).

*Primary Examiner*—Jose' G. Dees
*Assistant Examiner*—Alton Pryor
*Attorney, Agent, or Firm*—Oblon, Spivak, McClelland, Maier & Neustadt, P.C.

[57] ABSTRACT

A mildew resistant organopolysiloxane composition is provided, including (A) an organopolysiloxane having silanol groups or alkoxyl groups, (B) a hydrolyzable silane, and (C) a triazolyl group-containing compound. The composition further includes (D) bis(2-pyridylthio-1-oxide) zinc salt. The composition is excellent in mildew resistance and its durability as well as excellent in heat resistance and weathering properties. The cured products hardly undergo discoloration if exposed to UV light or heat. The composition is useful as a sealant to be used at wet locations.

12 Claims, No Drawings

MILDEW RESISTANT ORGANOPOLYSILOXANE COMPOSITIONS

BACKGROUND OF THE INVENTION

1. Field of the Invention

The present invention relates to an organopolysiloxane composition useful as a sealant or the like, the cured product of the composition being excellent in mildew resistance and its durability as well as excellent in heat resistance and weathering properties such as resistance to ultraviolet light, thus hardly undergoing discoloration.

2. Description of the Prior Arts

Since room temperature curable (RTV) organopolysiloxane compositions capable of being crosslinked by moisture contained in the air have good handleability and the cured products thereof are excellent in weathering properties and electric properties, they are used in sealants for construction, adhesives in electric and electronic fields, and the like. Particularly, deoxime type RTV organopolysiloxane compositions have a good adhesion to various adherends even at places where, for example, water is frequently used or a large amount of moisture exists, such as kitchens, bathes and lavatories in houses.

On the other hand, with an improvement in construction techniques of houses in recent years, air tightness of houses have been also improved. Thus, said places where water is frequently used or a large amount of moisture exists are suitable habitats for microorganisms such as mildew or mold. Particularly, mildew or mold extends its hyphae even into the inside of RTV silicone rubber, so that it is difficult to remove mildew or mold by application of chemicals, much less by wiping, the appearance of the silicone rubber is often impaired.

As a solution, a mildew proofing agent is kneaded into sealants. Particularly, for silicone sealants, in view of safety as well as mildew resistance, thiazole compounds (Japanese Pre-examination Patent Publication (kokai) 54-127960), benzimidazole compounds (Japanese Pre-examination Patent Publication (kokai) 54-43260 and 56-38348), etc. are proposed. However, silicone sealants containing these mildew proofing agents have insufficient mildew resistance.

In the Japanese Pre-examination Patent Publication (kokai) 2-306907, it is proposed to use p-chloro-m-xylol and bis(2-pyridylthio-1-oxide) zinc salt in combination for modified silicone sealants. However, the sealants containing the mildew proofing agent have a problem that they tend to turn yellow upon exposure to heat or ultraviolet light. Particularly, this tendency is more serious when the mildew proof agent is added in a large amount to deoxime type RTV silicone rubber compositions containing an aliphatic unsaturated group-containing silane. For this reason, it is impossible to increase the amount of the mildew proofing agent in such a way that the mildew proofing agent is effective for all types of mold or mildew without yellowing In the Japanese Pre-examination Patent Publication (kokai) 6-40821, it is proposed to use bis(2-pyridylthio-1-oxide) zinc salt in combination with a benzimidazole mildew proofing agent for improving discoloration and long-term mildew resistance. However, durability of the mildew resistance is still insufficient, and in particular when a hydrolyzable silane containing aliphatic unsaturated bonding is used as a curing agent, durability and discoloration are not improved sufficiently.

SUMMARY OF THE INVENTION

An object of the present invention is to solve the problems described above and to provide a mildew resistant organopolysiloxane composition, the cured product of which is excellent in mildew resistance and its durability as well as excellent in heat resistance and weathering properties such as ultraviolet light resistance, thus hardly undergoing discoloration, and which are particularly useful as a sealant to be used at places where water is frequently used.

Thus, the present invention provides A mildew resistant organopolysiloxane composition comprising:

(A) 100 parts by weight of an organopolysiloxane represented by the general formula (1):

$$HO-(SiR^1_2O)_n-H \qquad (1)$$

wherein $R^1$ is independently an unsubstituted or substituted monovalent hydrocarbon group with 1 to 10 carbon atoms, and n is a number such that said organopolysiloxane has a viscosity at 25° C. of 25 to 500,000 cSt, an organopolysiloxane represented by the general formula (2):

$$(R^2O)_{3-m}\overset{R^1_m}{\underset{|}{Si}}O(SiR^1_2O)_n\overset{R^1_m}{\underset{|}{Si}}(OR^2)_{3-m} \qquad (2)$$

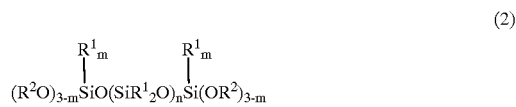

wherein $R^1$ and n are the same as in the general formula (1), $R^2$ is an alkyl group having 1 to 4 carbon atoms, and m is 0 or 1, or a mixture thereof;

(B) 0.1 to 30 parts by weight of a silane compound represented by the general formula (3):

$$R^3_aSiX_{4-a} \qquad (3)$$

wherein $R^3$ represents the same group as $R^1$ represents, X is a hydrolyzable group, and a is 0, 1 or 2, a partially hydrolyzed product of said silane compound, or a mixture thereof;

(C) 0.1 to 5 parts by weight of a triazolyl group-containing compound represented by the general formula (4):

$$Y-CR^4R^5-CR^6R^7-Z \qquad (4)$$

wherein $R^4$ and $R^5$ are independently a hydrogen atom or an substituted or unsubstituted monovalent hydrocarbon group, $R^6$ and $R^7$ are independently an alkoxyl group, a hydrogen atom or an alkyl group, Y is a hydroxyl group or a nitrile group, and Z is a triazolyl group; and (D) 0.001 to 2 parts by weight of bis(2-pyridylthio-1-oxide) zinc salt.

The organopolysiloxane composition of the present invention gives a silicone rubber excellent in mildew resistance and its durability and also excellent in heat resistance and weathering properties such as ultraviolet light resistance, the silicone rubber hardly undergoing discoloration. The silicone rubber is useful for sealants used at places where water is frequently used and sealants for construction.

DETAILED DESCRIPTION OF THE PREFERRED EMBODIMENTS

The present invention will be described below in detail. In the following the terminology "mildew" includes mildew and mold.

(A) Organovolysiloxane

The organopolysiloxane of the component (A) is a base polymer component of the composition according to the present invention, and is a compound represented by said general formula (1) or a compound represented by the general formula (2) or a mixture of these compounds.

In the general formula (1), $R^1$ is independently an unsubstituted or substituted monovalent hydrocarbon group having 1 to 10 carbon groups, for example, an alkyl group such as methyl, ethyl, propyl, isopropyl, butyl, isobutyl, tert-butyl, pentyl, neopentyl, hexyl, heptyl, octyl, nonyl and decyl groups; a cycloalkyl group such as cyclopentyl, cyclohexyl and cycloheptyl groups; an alkenyl group such as vinyl, allyl, propenyl, isopropenyl, butenyl, isobutenyl, hexenyl and cyclohexenyl groups; an aryl group such as phenyl, tolyl and xylyl groups; an aralkyl group such as benzyl, phenylethyl, phenylpropyl and methylbenzyl groups; and corresponding substituted groups derived from said groups by substituting at least part of hydrogen atoms bonded to carbon atoms contained in said groups with a substituent such as a halogen atom, e.g., fluorine and chlorine atoms, a nitrile group, for example, a halogen-substituted hydrocarbon group such as chloromethyl, 3-chloropropyl, 3,3,3-trifluoropropyl, 3,3,4,4,5,5,6,6,6-nonafluorohexyl, 4-chlorophenyl and 2-(4-chlorophenyl)ethyl and 4-fluorophenyl groups and a 2-cyanoehtyl group; preferably an unsubstituted or substituted monovalent hydrocarbon group having 1 to 10 carbon atoms and being free of aliphatic unsaturation, such as an alkyl group, a cycloalkyl group, an aryl group, an aralkyl group, and a radical derived from said groups by the substitution of at least part of hydrogen atoms thereof with a substituent, as mentioned above; and more preferably methyl, phenyl and 3,3,3-trifluoropropyl groups. The $R^1$ groups may be the same or different. In said general formula (1), n is a number such that this organopolysiloxane has a viscosity at 25° C. of 25 to 500,000 cSt, preferably 1,000 to 100,000 cSt.

In the general formula (2), $R^1$ and n are as defined above, $R^2$ is an alkyl group having 1 to 4 carbon atoms such as methyl and ethyl groups, preferably methyl group, and m is 0 or 1, preferably 0.

The organopolysiloxane of the component (A) may be a combination of two or more which are different in viscosity or structure.

(B) Silane Compound and/or its Partially Hydrolyzed Products

The silane compound and/or its partially hydrolyzed products of the component (B) act as a crosslinking agent in the composition according to the present invention. The silane compound has an average of 2 or more of silicon-bonded hydrolyzable groups in its molecule (hereinafter, referred to as hydrolyzable silane), and is represented by said general formula (3).

In the general formula (3), $R^3$ independently represents the same group as $R^1$ represents, preferably methyl, ethyl, propyl, phenyl and vinyl groups. X is a hydrolyzable group, including, for example, alkoxyl groups such as methoxy and ethoxy groups; ethenoxy groups such as propenyloxy; acyloxy groups such as acetoxy; ketoxime groups such as butanoxime; and amino, amide, aminoxy and alkenyloxy groups. The symbol a is 0, 1 or 2, preferably 0 or 1.

In the present invention, use of a ketoxime silane represented by the general formula (5):

$$R^9_a Si(ON=CR^8_2)_{4-a} \quad (5)$$

wherein $R^8$ is the same group as $R^1$ in said general formula (1), $R^9$ is an unsubstituted hydrocarbon group having 1 to 10 carbon atoms, and a is 0, 1 or 2, as the crosslinking agent of the component (B) markedly prevents the yellowing.

In the general formula (5), specific examples of $R^8$ include those of $R^1$. Specific examples of the unsubstituted aliphatic hydrocarbon group represented by $R^9$ include the unsubstituted aliphatic hydrocarbon groups exemplified for $R^1$, i.e., alkyl groups such as methyl, ethyl and propyl; cycloalkyl groups such as cyclohexyl; and alkenyl groups such as vinyl and allyl.

The hydrolyzable silane of the component (B) may be used singly or in combination of two or more.

The hydrolyzable silane includes, for example, ketoximesilanes such as methyltris(dimethylketoxime)silane, methyltris(methylethylketoxime)silane, ethyltris(methylethylketoxime)silane, methyltris(methylisobutylketoxime)silane, vinyltris(methylethylketoxime)silane, and vinyltributanoximesilane, and a variety of silanes such as methyltrimethoxysilane, methyltriacetoxysilane, methyltriisopropenoxysilane, vinyltrimethoxysilane, and vinyltriacetoxysilane.

Of course, a partially hydrolyzed product of said hydrolyzable silane or a mixture of the hydrolyzable silane with the partially hydrolyzed product thereof can be also used as the component (B). In this case, the partially hydrolyzed product can be singly or in combination of two or more thereof.

The hydrolyzable silane and/or the partially hydrolyzed product thereof is used in an amount of 0.1 to 30 parts by weight, preferably 1 to 15 parts by weight, per 100 parts by weight of the component (A). If the amount is less than 0.1 part by weight, sufficient crosslinking does not take place, thus producing a cured product without a desired rubberlike elasticity. If the amount is above 30 parts by weight, mechanical properties are poor.

(C) Triazolyl Group-containing Compound

The triazolyl group-containing compound of the component (C) is represented by said general formula (4) and is an important element of the present invention in imparting heat resistance, ultraviolet light resistance and mildew resistance to the composition of the present invention.

In the general formula (4), $R^4$ or $R^5$ is a hydrogen atom or an unsubstituted or substituted monovalent hydrocarbon group. The monovalent hydrocarbon group includes the examples listed for $R^1$ in the general formula (1), and is preferably aliphatic saturated hydrocarbon groups. Especially preferred atom or groups as $R^4$ and $R^5$ are a hydrogen atom, 2-(4-chlorophenyl)ethyl, 4-chlorophenyl, dichlorophenyl and n-butyl groups.

In the general formula (4), $R^6$ and $R^7$ are each an alkoxy group, a hydrogen atom or an alkyl group. The alkyl group includes, for example, methyl, ethyl, propyl, isopropyl, butyl, isobutyl, tert-butyl, pentyl, neopentyl, hexyl, heptyl, octyl, nonyl and decyl groups. The alkoxy group includes, for example, methoxy, ethoxy and propoxy groups. Further, the alkoxy group defined herein includes a biphenylyl alkoxy group in which said alkoxy group has been bonded to the biphenylyl group. Particularly preferable $R^6$ and $R^7$ are a hydrogen atom and a biphenylyl alkoxy group.

The group Y in the general formula (4) is a hydroxyl group or a nitrile group.

The triazolyl group Z in the general formula (4) include, for example, 1,2,4-triazol-1-yl group represented by the following formula:

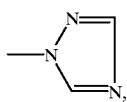

1,2,3-triazol-1-yl group represented by the following formula:

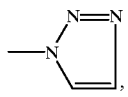

1,2,3-triazol-2-yl group represented by the following formula:

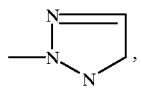

1,2,4-triazol-4-yl group represented by the following formula:

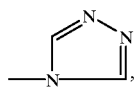

and 1,3,4-triazol-1-yl group represented by the following formula:

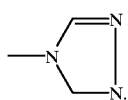

Particularly typical triazolyl group is 1,2,4-triazol-1-yl group.

Specific examples of the triazolyl group-containing compound used in the present invention include, for example, tebuconazole: 2-(4-chlorophenyl)ethyl-α-(1,1-dimethylethyl)-1H-1,2,4-triazol-1-yl-ethanol represented by the following formula:

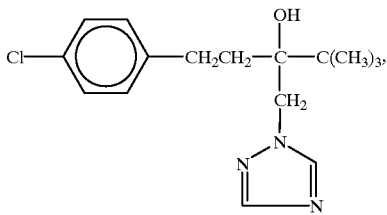

hexaconazole: (RS)-2-(2,4-dichlorophenyl)-1-(1H-1,2,4-triazol-1-yl)hexane-2-ol represented by the following formula:

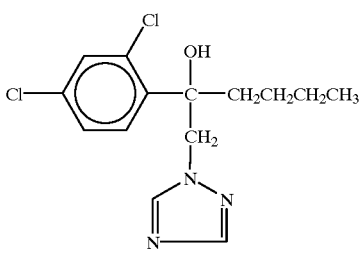

microbutanyl: 2-p-chlorophenyl-2-(1H-1,2,4-triazol-1-ylmethyl)hexane nitrile represented by the following formula:

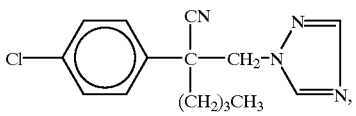

and bitertanol: all-rac-1-(biphenyl-4-yloxy)-3,3-dimethyl-1-(1H-1,2,4-triazol-1-yl)butane-2-ol represented by the following formula:

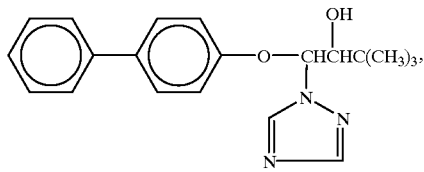

and preferably 2-(4-chlorophenyl)ethyl-α-(1,1-dimethylethyl)-1H-1,2,4-triazol-1-yl-ethanol (tebuconazole).

The triazole group-containing compound may be used singly or in combination of two or more. The amount thereof is 0.1 to 5 parts by weight, preferably 0.3 to 2 parts by weight, particularly preferably 0.3 to 1 part by weight, per 100 parts by weight of the component (A). If the amount used is less than 0.1 parts by weight, the resulting composition may have an insufficient mildew resistance, heat resistance and ultraviolet light resistance. On the other hand, if the amount is above 5 parts by weight, an improvement of said effects such as mildew resistance cannot be expected for the increase of the amount and further a cured product of the composition may turn yellow.

(D) Bis(2-pyridylthio-1-oxide) Zinc Salt

The bis(2-pyridylthio-1-oxide) zinc salt of the component (D) is represented by the formula:

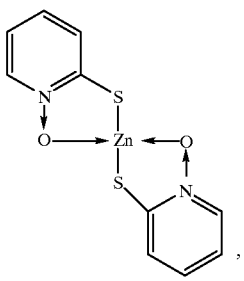

and this is an important component which improves, together with the triazole compound of the component (C), synergistically durability of mildew resistance of the composition according to the present invention.

The amount of the component (D) is 0.001 to 2 parts by weight, preferably from 0.05 to 1.5 parts by weight. If the amount is less than 0.001 part by weight, the effects described above are insufficient. If the amount is above 2 parts by weight, the effects are not noticeably improved but may impair resistance to discoloration.

Other Components

To the composition of the present invention, curing catalysts, fillers, and various additives can be optionally added in addition to said components (A) to (D).

(Curing Catalyst)

Curing catalysts include, for example, tin carbonates such as tin octenate, tin naphthenate, tin caprylate and tin oleate;

tin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin and dibutyltin benzylmaleate; metal alkoxides such as tetraethyl titanate, tetrapropyl titanate, tetrabutyl titanate and tetraethoxy zirconate; organometal compounds such as iron octenate, iron naphthenate, lead naphthenate, zinc naphthenate, zinc stearate, zinc 2-ethylhexoate, lead 2-ethyloctoate, iron 2-ethylhexoate, cobalt 2-ethylhexoate, manganese 2-ethylhexoate, cobalt naphthenate and alkoxyaluminum compounds; aminoalkyl group-substituted alkoxysilanes such as 3-aminopropyltriethoxysilane and N-(trimethoxysilylpropyl)ethylenediamine; amine compounds and salts thereof, such as hexylamine and dodecylamine phosphate; quaternary ammonium salts such as benzyltriethylammonium acetate; alkali metal salts of lower aliphatic acids, such as potassium acetate, sodium acetate and lithium oxalate; and dialkylhydroxylamines such as dimethylhydroxylamine and diethylhydroxylamine.

The amount of the curing agent used is generally 0 to 5 parts by weight, preferably 0 to 1 part by weight, per 100 parts by weight of the component (A).

(Filler)

The fillers include, for example, fumed silica and a hydrophobic fumed silica prepared by treating the surface of fumed silica with chlorosilane; finely divided silica, colloidal calcium carbonate and those of which surfaces have been treated with a fatty acid soap, rosin or rosin ester; heavy calcium carbonate; diatomaceous earth; iron oxide; titanium oxide; zinc oxide; magnesium carbonate; zinc carbonate; metal carbonates; carbon black; and fine powdery mica. These fillers can be used singly or in a combination of two or more thereof.

The filler may be used in an amount of generally about 5 to 300 parts by weight per 100 parts by weight of said component (A).

(Other Various Additives)

The other additives include, for example, thixotropy improvers such as polyether compounds; adhesive assistants, for example, aminosilanes such as γ-aminopropyltriethoxysilane, and epoxysilanes such as γ-glycidylpropyltrimethoxysilane; colorants such as pigments and dyes; heat resistance improvers such as red oxide and cerium oxide; dehydrating agents; rust preventive agents; and silicone resins. Other mildewproofing agents can be added in such an amount that a cured product of the composition does not turn yellow.

In the present invention, it is preferred to add a non-reactive silicone fluid such as dimethylsiloxane whose terminals are blocked with triorganosilyl groups such as trimethylsilyl group in an amount of 50 parts by weight or less, particularly 5 to 30 parts by weight, per 100 parts by weight of the component (A).

The composition according to the present invention is cured by moisture in the air at room temperature to produce a cured product.

EXAMPLES

The present invention will now be described with reference to working examples.

Example 1

To 90 parts by weight of a polydimethylsiloxane having a viscosity at 25° C. of 20,000 cSt terminated with a silanol group at the ends thereof, was added 10 parts by weight of a fumed silica of which surface had been treated with dimethyldichlorosilane, followed by mixing in a mixer. Subsequently, to the mixture obtained were admixed 6 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane, 0.5 part by weight of tebuconazole and 0.05 part by weight of bis(2-pyridylthio-1-oxide) zinc salt, followed by mixing thoroughly under reduced pressure to produce a mildew resistant organopolysiloxane composition.

Example 2

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane, 0.5 part by weight of tebuconazole and 0.05 part by weight of bis(2-pyridylthio-1-oxide) zinc salt, followed by mixing thoroughly under reduced pressure to produce a mildew resistant organopolysiloxane composition.

Example 3

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane, 0.25 part by weight of tebuconazole and 0.1 part by weight of bis(2-pyridylthio-1-oxide) zinc salt, followed by mixing thoroughly under reduced pressure to produce a mildew resistant organopolysiloxane composition.

Comparative Example 1

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane and 0.25 part by weight of tebuconazole, followed by mixing thoroughly under reduced pressure to produce a mildew resistant organopolysiloxane composition.

Comparative Example 2

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane and 0.05 part by weight of bis(2-pyridylthio-1-oxide) zinc salt, followed by mixing thoroughly under reduced pressure to produce a mildew resistant organopolysiloxane composition.

Comparative Example 3

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane and 3.0 parts by weight of bis(2-pyridylthio-1-oxide) zinc salt, followed by mixing thoroughly under reduced pressure to produce a mildew resistant organopolysiloxane composition.

Comparative Example 4

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane, 6.0 parts by weight of tebuconazole and 3.0 parts by weight of bis(2-pyridylthio-1-oxide) zinc salt, followed by mixing thoroughly under reduced pressure to produce a mildew resistant organopolysiloxane composition.

Comparative Example 5

To 90 parts by weight of a polydimethylsiloxane having a viscosity at 25° C. of 20,000 cSt terminated with a silanol group at the ends thereof, were added 10 parts by weight of polydimethylsiloxane having a viscosity at 25° C. of 100 cSt terminated with a trimethylsiloxy group at the ends thereof, 10 parts by weight of a fumed silica of which surface had been treated with dimethyldichlorosilane, followed by mixing in a mixer. Subsequently, to the mixture obtained were admixed 2 parts by weight of vinyltributanoximesilane, 4 parts by weight of methyltributanoximesilane and 0.1 part by weight of dibutyltin dioctoate, followed by mixing thoroughly under reduced pressure. To the mixture obtained were further added 1.0 part by weight of γ-aminopropyltriethoxysilane, 0.5 part by weight of methylbenzimidazol-2-yl carbamate and 0.05 part by weight of bis(2-pyridylthio-1-oxide) zinc salt, followed by mixing thoroughly under reduced pressure to produce a mildew resistant organopolysiloxane composition.

Each constitution of the compositions obtained in Examples and Comparative Examples is given in Table 1. The unit of the numerals in the table is part by weight.

Then, a sample was taken from each composition and subjected to discoloration test and mildewproofing test in the following manner. The results are given in Table 1.

<Test Methods>

Discoloration test:

A sample was formed into a sheet having a thickness of 2 mm and the sheet was left to stand in the atmosphere of 20±3° C. and 55±10% RH for a week to cure. The cured sheet (specimens) was subjected to the following discoloration test.

1. Thermal Discoloration Test:

A formed and cured sheet (specimen) is measured for initial color difference using the color-difference meter CR-300 manufactured by Minolta Camera Co., Ltd., and subsequently it is left to stand and aged at 90° C. in a dryer for 200 hours. After that, the aged sheet is measured for color difference. The degree of yellowing (Δb) is observed.

The larger the value of Δb, the greater the degree of yellowing, as indicated in the table below. Values of Δb of 3.0 or above are said to pass the discoloration test in quality. This also applies to the ultraviolet light-discoloration test below.

| Δb | Evaluation on yellowing |
| --- | --- |
| 0–0.5 | A trace of difference |
| 0.5–1.5 | Slight difference |
| 1.5–3.0 | Noticeable difference |
| 3.0–6.0 | Appreciable difference |
| 6.0–12.0 | Much difference |
| 12.0 or above | Very much difference |

2. Ultraviolet Light-discoloration Test:

The formed and cured sheet is measured for initial color difference using color-difference meter CR-300 manufactured by Minolta Camera Co., Ltd., and subsequently it is aged under irradiation with ultraviolet light from a medical bactericidal lamp positioned at a distance of 10 cm from the surface of the sheet for 24 hours. After that, the aged sheet is measured for color difference. The degree of yellowing (Δb) is observed.

Mildew Resistance Test 1 (JIS Z 2911):

A specimen is measured for mildew resistance according to JIS Z 2911 and evaluated according to the criteria below.

Evaluation Criteria:

Rank 1: Mildew hyphae inoculated in a given amount on a specimen have grown to cover ⅓ or more of the entire surface of the specimen.

Rank 2: Mildew hyphae inoculated in a given amount on a specimen have grown to cover less than ⅓ of the entire surface of the specimen.

Rank 3: The growth of mildew hyphae is not observed on the surface of the specimen.

Mildew Resistance Test 2 (MIL-STD):

A specimen is measured for mildew resistance according to MIL-STD 810D Method 508.3 (variation) and evaluated according to the criteria below.

Evaluation Criteria:

Rank 0: No growth (No growth of hyphae is observed)

Rank 1: Slight growth (Sparse or limited growth of hyphae is observed)

Rank 2: Some growth (Discrete colonies or slight colonies are observed on the surface of a specimen)

Rank 3: Moderate growth (Growth and propagation of substantial amount of hyphae and change of chemical or physical properties of materials are observed)

Rank 4: Vigorous propagation (Growth of large amount of hyphae. Occurrence of deformation and decomposition of materials)

Durability Test:

A specimen is immersed in a 10 L vessel filled with hot water at 50° C., provided that the hot water is replaced with a fresh one every three days. Subsequently, the specimen is tested for mildew resistance in the same manner as described above to learn the durability of mildew resistance.

TABLE 1

| | | Examples | | |
|---|---|---|---|---|
| | | 1 | 2 | 3 |
| Composition | Silanol-terminated polydimethylsiloxane (Viscosity: 20,000 cSt) | 90 | 90 | 90 |
| | Trimethylsiloxy-terminated polydimethylsiloxane (Viscosity: 100 cSt) | — | 10 | 10 |
| | Fumed silica | 10 | 10 | 10 |
| | Methyltributanoxime-silane | 6 | 4 | 4 |
| | Vinyltributanoxime-silane | — | 2 | 2 |
| | Dibutyltin dioctoate | 0.1 | 0.1 | 0.1 |
| | γ-Aminopropyltri-ethoxysilane | 1.0 | 1.0 | 1.0 |
| | Tebuconazole | 0.5 | 0.5 | 0.25 |
| | Bis(2-pyridylthio-1-oxide)zinc salt | 0.05 | 0.05 | 0.1 |
| | Methylbenzimidazol-2-yl carbamate | — | — | — |
| Discoloration test | Thermal discoloration test | 2.1 | 2.4 | 2.3 |
| | UV light-discoloration test | 2.4 | 2.5 | 2.9 |
| Mildew resistance test 1 | Initial result | 3 | 3 | 3 |
| | Result after immersion in water | 3 | 3 | 3 |
| Mildew resistance test 2 | Initial result | 0 | 0 | 0 |
| | Result after immersion in water | | | |

| | | Comparative Examples | | | | |
|---|---|---|---|---|---|---|
| | | 1 | 2 | 3 | 4 | 5 |
| Composition | Silanol-terminated polydimethylsiloxane (Viscosity: 20,000 cSt) | 90 | 90 | 90 | 90 | 90 |
| | Trimethylsiloxy-terminated polydimethylsiloxane (Viscosity: 100 cSt) | 10 | 10 | 10 | 10 | 10 |
| | Fumed silica | 10 | 10 | 10 | 10 | 10 |
| | Methyltributanoxime-silane | 4 | 4 | 4 | 4 | 4 |
| | Vinyltributanoxime-silane | 2 | 2 | 2 | 2 | 2 |
| | Dibutyltin dioctoate | 0.1 | 0.1 | 0.1 | 0.1 | 0.1 |
| | γ-Aminopropyltri-ethoxysilane | 1.0 | 1.0 | 1.0 | 1.0 | 1.0 |
| | Tebuconazole | 0.25 | — | — | 6.0 | — |
| | Bis(2-pyridylthio-1-oxide)zinc salt | — | 0.05 | 3.0 | 3.0 | 0.05 |
| | Methylbenzimidazol-2-yl carbamate | — | — | — | — | 0.5 |
| Discoloration test | Thermal discoloration test | 2.0 | 1.5 | 1.8 | 6.5 | 7.2 |
| | UV light-discoloration test | 0.9 | 2.3 | 16.0 | 17.2 | 4.5 |
| Mildew resistance test 1 | Initial | 3 | 2 | 3 | 3 | 3 |
| | After immersion in water | 2 | 2 | 3 | 3 | 3 |
| Mildew resistance test 2 | Initial | 1 | 1 | 0 | 0 | 0 |
| | After immersion in water | 3 | 3 | 1 | 0 | 0 |

What is claimed is:

1. A mildew resistant organopolysiloxane composition comprising:

(A) 100 parts by weight of an organopolysiloxane represented by the general formula (1):

$$HO-(SiR^1{}_2O)_n-H \qquad (1)$$

wherein $R^1$ is independently an unsubstituted or substituted monovalent hydrocarbon group with 1 to 10 carbon atoms, and n is a number such that said organopolysiloxane has a viscosity at 25° C. of 25 to 500,000 cSt, an organopolysiloxane represented by the general formula (2):

$$(R^2O)_{3-m}\overset{R^1{}_m}{\underset{|}{Si}}O(SiR^1{}_2O)_n\overset{R^1{}_m}{\underset{|}{Si}}(OR^2)_{3-m}$$

wherein $R^1$ and n are the same as in the general formula (1), $R^2$ is an alkyl group having 1 to 4 carbon atoms, and m is 0 or 1, or a mixture thereof;

(B) 0.1 to 30 parts by weight of a silane compound represented by the general formula (3):

$$R^3{}_aSiX_{4-a} \qquad (3)$$

wherein $R^3$ represents the same group as $R^1$ represents, X is a hydrolyzable group, and a is 0, 1 or 2, a partially hydrolyzed product of said silane compound, or a mixture thereof;

(C) 0.1 to 5 parts by weight of a triazolyl group-containing compound represented by the general formula (4):

$$Y-CR^4R^5-CR^6R^7-Z \qquad (4)$$

wherein $R^4$ and $R^5$ are independently a hydrogen atom or an substituted or unsubstituted monovalent hydrocarbon group, $R^6$ and $R^7$ are independently an alkoxyl group, a hydrogen atom or an alkyl group, Y is a hydroxyl group or a nitrile group, and Z is a triazolyl group; and (D) 0.001 to 2 parts by weight of bis(2-pyridylthio-1-oxide) zinc salt.

2. The composition according to claim 1, wherein the silane compound of the component (B) is represented by the general formula (5):

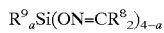  (5)

wherein $R^8$ represents the same group as $R^1$ in said general formula (1) does, $R^9$ is an unsubstituted hydrocarbon group having 1 to 10 carbon atoms, and a is 0, 1 or 2.

3. The composition according to claim 1, wherein the component (A) is an organopolysiloxane having the general formula (1) wherein $R^1$ is independently methyl, phenyl or 3,3,3-trifluoropropyl group, and n is a number such that the organopolysiloxane of the general formula (1) has a viscosity at 25° C. of 1,000 to 100,000 cSt, or an organopolysiloxane having the general formula (2) wherein $R^1$ is independently methyl, phenyl or 3,3,3-trifluoropropyl group, $R^2$ is a methyl group, m is 0, and n is a number such that the organopolysiloxane of the general formula (2) has a viscosity at 25° C. of 1,000 to 100,000 cSt.

4. The composition according to claim 1, wherein in the general formula (3) $R^3$ is independently methyl, ethyl, propyl, phenyl or vinyl group, X is an alkoxyl, ethenoxy, acyloxy, ketoxime, amino, amide, aminoxy or alkenyloxy group, and a is 0 or 1.

5. The composition according to claim 1, wherein the silane compound of the general formula (3) is a ketoxime silane represented by the general formula (5):

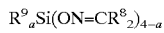  (5)

wherein $R^8$ is the same group as $R^1$ in said general formula (1), $R^9$ is an unsubstituted hydrocarbon group having 1 to 10 carbon atoms, and a is 0, 1 or 2.

6. The composition according to claim 1, wherein the silane compound of the component (B) is a ketoximesilane, methyltrimethoxysilane, methyltriacetoxysilane, methyltriisopropenoxysilane, vinyltrimethoxysilane or vinyltriacetoxysilane, or a mixture of two or more thereof.

7. The composition according to claim 1, wherein in the general formula (4) $R^4$ and $R^5$ are independently a hydrogen atom or an aliphatic saturated hydrocarbon group, and $R^6$ and $R^7$ are independently a hydrogen atom or a biphenylyl alkoxy group.

8. The composition according to claim 7, wherein in the general formula (4) $R^4$ and $R^5$ are independently a hydrogen atom, 2-(4-chlorophenyl)ethyl, 4-chlorophenyl, dichlorophenyl or n-butyl group, and $R^6$ and $R^7$ are independently a hydrogen atom or a biphenylyl alkoxy group.

9. The composition according to claim 1, wherein the triazolyl group-containing compound of the component (C) is tebuconazole represented by the following formula:

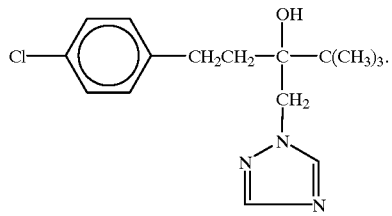

10. The composition according to claim 1, wherein the component (B), the component (C) and the component (D) are present in amounts of 1 to 15 parts by weight, 0.3 to 2 parts by weight, and 0.05 to 1.5 parts by weight, respectively, per 100 parts by weight of the component (A).

11. The composition according to claim 1, further comprises a curing catalyst, filler, thixotropy improver, adhesive assistant, colorant, heat resistance improver, dehydrating agent, rust preventive agent, silicone resin, or a mixuture of two or more thereof.

12. A cured product obtained by curing the composition as defined in claim 1.

* * * * *